United States Patent
Sato

(10) Patent No.: US 10,915,839 B2
(45) Date of Patent: Feb. 9, 2021

(54) MATCHING APPARATUS

(71) Applicant: FORUM ENGINEERING INC., Tokyo (JP)

(72) Inventor: Tsutomu Sato, Tokyo (JP)

(73) Assignee: FORUM ENGINEERING INC., Tokyo (JP)

(*) Notice: Subject to any disclaimer, the term of this patent is extended or adjusted under 35 U.S.C. 154(b) by 92 days.

(21) Appl. No.: 16/116,275

(22) Filed: Aug. 29, 2018

(65) Prior Publication Data

US 2019/0130338 A1    May 2, 2019

(30) Foreign Application Priority Data

Nov. 2, 2017   (JP) .................................. 2017-212960

(51) Int. Cl.
   *G06Q 10/06*        (2012.01)
   *G06Q 10/10*        (2012.01)
   (Continued)

(52) U.S. Cl.
   CPC ... *G06Q 10/063112* (2013.01); *G06F 16/248* (2019.01); *G06F 16/24578* (2019.01);
   (Continued)

(58) Field of Classification Search
   CPC ......... G06Q 10/00; G06Q 40/00; G06Q 40/06
   (Continued)

(56) References Cited

U.S. PATENT DOCUMENTS 5,111,391 A * 5/1992 Fields .................... G06Q 10/06
                                                   705/7.14
5,164,897 A * 11/1992 Clark .................. G06Q 10/1053
                                                   705/321

(Continued)

FOREIGN PATENT DOCUMENTS

JP       2017-97498 A     6/2017

OTHER PUBLICATIONS

Office Action issued for related U.S. Appl. No. 16/116,151 dated Apr. 14, 2020.

(Continued)

*Primary Examiner* — Romain Jeanty
(74) *Attorney, Agent, or Firm* — Myers Wolin, LLC

(57) ABSTRACT

Through a network, an administrative server is connected with a terminal of an applicant and a terminal of a company which is a seeker. The administrative server comprises an applicant information database which stores applicant information including a registered address of the applicant, and a seeker information database which stores requirement information including a registered address of the company. The administrative server calculates a matching score of the both based on the applicant information and the requirement information, and make the terminal of the applicant display an image picture of distributed seekers 52 when it is requested by the applicant. The image picture of distributed seekers 52 includes a neighboring map showing around an address designated by the applicant. On the neighboring map, there is shown matching scores of the applicant and the (Continued)

companies, each matching score being indicated at the registered address of the each company.

17 Claims, 10 Drawing Sheets

(51) Int. Cl.
  *G06F 16/29* (2019.01)
  *G06F 16/9535* (2019.01)
  *G06F 16/9537* (2019.01)
  *G06F 16/2457* (2019.01)
  *G06F 16/248* (2019.01)

(52) U.S. Cl.
  CPC .......... *G06F 16/29* (2019.01); *G06F 16/9535* (2019.01); *G06F 16/9537* (2019.01); *G06Q 10/1053* (2013.01)

(58) Field of Classification Search
  USPC ...................................................... 705/7.29

See application file for complete search history.

(56) References Cited

U.S. PATENT DOCUMENTS

| | | | | |
|---|---|---|---|---|
| 5,978,768 | A * | 11/1999 | McGovern | G06Q 10/1053 |
| | | | | 705/321 |
| 8,429,664 | B2 * | 4/2013 | Ajima | G06F 9/4881 |
| | | | | 718/104 |
| 2007/0033186 | A1 * | 2/2007 | Cinkle | G06Q 10/10 |
| 2008/0040024 | A1 * | 2/2008 | Silva | G01C 21/3635 |
| | | | | 701/436 |
| 2012/0041889 | A1 * | 2/2012 | Morrison | G06Q 10/105 |
| | | | | 705/321 |
| 2013/0262175 | A1 * | 10/2013 | Deshpande | G06Q 10/06 |
| | | | | 705/7.25 |
| 2014/0337242 | A1 * | 11/2014 | Bailey | G06Q 10/1053 |
| | | | | 705/321 |
| 2016/0063442 | A1 * | 3/2016 | Bennett | G06Q 10/1053 |
| | | | | 705/319 |
| 2018/0268341 | A1 * | 9/2018 | Rini | G06Q 10/06398 |

OTHER PUBLICATIONS

Office Action issued for related U.S. Appl. No. 16/116,151 dated May 18, 2020.
Final Office Action issued by the United States Patent and Trademark Office for corresponding U.S. Appl. No. 16/116,151, electronically delivered on Oct. 5, 2020.

* cited by examiner

FIG. 6

- ○○ Inc.
- ○○ Development Center
- Design Department. Machine Design.   Design Forefront throughout your life.

Skill Matching Rate  85%     Congeniality Matching Rate 72.5%

? IM Dictionary Matching                                    85

- Type of Job — 80
- Education — 85
- Products/Parts — 95
- Technical Field/Tools — 50
- Syllabus — 42

Radar chart axes: Type of Job, Education, Products/Parts, Technical Field/Tools

We will accept any inquiry.

Please send a Message.                                   Send

FIG. 7

○○ Inc.
○○ Development Center
Design Department. Machine Design.   Design Forefront throughout your life.

| Skill Matching Rate 85% | Congeniality Matching Rate 72.5% |

Introversion/Extroversion 51.0%
Introversion (98) ——○—— Extroversion
Ideal Value 0
$ Integrity 11.0%
Challenge Mind ——(72)—○— Order Property
Ideal Value $ Value
$ Independence/Cooperation 51.0%
Independence ——○(12)—— Cooperation
Ideal Value $ Value
$ Intellectual Curiosity 51.0%
Character to be full of one thing ——(98)——○—— Character to be interested in widely
Ideal Value $ Value
$ Atomosphere/Nature of Department or Offer Atomosphere of Department or Offer        Nature of Department or Offer Introversion ——(0)—— Extroversion          Similar Person ——(0)—— Diversity Independence —(50)—— Cooperation            Criativity —(50)—— Accuracy Challenge Mind ———(100) Order Property      Player ———(100) Leader Character to be full of one thing ——(0)—— Character to be interested in widely ○ We will accept any inquiry.

Please send a Message                                  send

FIG. 8

- ○○Years Old / Upcoming Graduate at May, 2018 from Department of Machine Engineering, Facalty of Engineering, ○○University
  - Major Field of Study: Mechanical System
  - Preferable Work location: ○○Prefecture

- ○○Years Old
  /Graduate from Department of Machine Engineering,
  Facalty of Engineering, ○○University
  /Experienced three Companies
  /500 Million Jp-Yen
  /Unmarried
  - Department: Mechanical Design /Die Design /Production Engineering /Preproduction Planning
  - Usable Tools: 3D CAD/CATIA/..
  - Field, Type of Job: Computer/Peripherals /OA Equipments
  - Linguistic Ability (English): Daily Life Conversation Level

- Skill Matching Rate  85%
- Congeniality Matching Rate 72.5%

? IM Dictionary Matching  85

- Type of Job — 62
- Education — 17
- Products/Parts — 62
- Technical Field/Tools — 12
- Syllabus — 42

(Radar chart: Type of Job, Education, Products/Parts, Technical Field /Tools)

● We will accept any inquiry.

Please send a Message | send

FIG. 9

```
┌─────────────────────────────────────────────────────────────────────┐ 62
│ ⓘ                                                                    │
│ ┌─────────────────────────────────────────────────────────────────┐ │
│ │ ◉ ○○Years Old / Upcomig Graduate at May, 2018 from Department    │ │
│ │   of Machine Engineering, Facalty of Engineering, ○○University   │ │
│ │        [Major Field of Study]  Mechanical System                 │ │
│ │   [Preferable Work location]  ○○Prefecture                       │ │
│ └─────────────────────────────────────────────────────────────────┘ │
│ ┌─────────────────────────────────────────────────────────────────┐ │
│ │ ◉ ○○Years Old/Graduate from      [Department] Mechanical Design │ │
│ │   Department of Machine Engineering,         /Die Design         │ │
│ │   Facalty of Engineering, ○○University       /Production Eng.    │ │
│ │   /Experienced three Companies /500          /Preproduction Plan │ │
│ │   Million Jp-Yen | Unmarried     [Usable Tools] 3D CAD/CATIA/..  │ │
│ │   [Field,]  Computer/Peripherals  [Linguistic]  Daily Life       │ │
│ │   [Type of Job] /OA Equipments    [Ability(English)] Conversation Level │
│ └─────────────────────────────────────────────────────────────────┘ │
│ ┌──────────────────────────────┬──────────────────────────────────┐ │
│ │ 🔧 Skill Matching Rate 85%   │ ♡ Congeniality Matching Rate 72.5%│ │
│ ├──────────────────────────────┼──────────────────────────────────┤ │
│ │ Introversion/Extroversion 51.0%│ Integrity              11.0%   │ │
│ │                              │ Challenge       Order            │ │
│ │ Introversion(98)═○═Extroversion│   Mind  ─(72)─○  Property       │ │
│ │      [Ideal Value $ Value]    │        [Ideal Value $ Value]     │ │
│ │              $               │              $                   │ │
│ ├──────────────────────────────┼──────────────────────────────────┤ │
│ │ Independence/Cooperation 51.0%│ Intellectual Curiosity  51.0%   │ │
│ │                              │ Character              Character │ │
│ │                              │ to be full              to be    │ │
│ │ Independence═○(12)═ Cooperation│ of one thing (98)   interested  │ │
│ │                              │                        in widely │ │
│ │   [Ideal Value $ Value]       │    [Ideal Value $ Value]         │ │
│ │           $                  │            $                     │ │
│ └──────────────────────────────┴──────────────────────────────────┘ │
│ ┌─────────────────────────────────────────────────────────────────┐ │
│ │           Atomosphere/Nature of Department or offer              │ │
│ │   Atomosphere of Department or offer    Nature of Department or offer│
│ │                                          Similar                 │ │
│ │ Introversion ═(0)═ Extroversion          Person ─(0)─ Diversity  │ │
│ │                                                                  │ │
│ │ Independence ═(50)═ Cooperation         Criativity ─(50)─ Accuracy│ │
│ │                                                                  │ │
│ │ Challenge              Order            Player  ──(100) Leader   │ │
│ │   Mind  ──────(100)    Property                                  │ │
│ │                                                                  │ │
│ │ Character                                                        │ │
│ │ to be full         Character to be                               │ │
│ │ of one thing ═(0)═ interested in widely                          │ │
│ └─────────────────────────────────────────────────────────────────┘ │
└─────────────────────────────────────────────────────────────────────┘
```

MATCHING APPARATUS

CROSS-REFERENCE TO RELATED APPLICATION

This application claims priority to Japanese Patent Application No. 2017-212960, filed on Nov. 2, 2017. The contents of which are wholly incorporated herein by reference.

FIELD

Embodiments of the present disclosure relate to a matching apparatus, more particularly to a matching apparatus which is appropriate for supplying information for effectively implementing a high quality matching.

BACKGROUND ART

Japanese Patent Laid-Open No. 2017-97498 discloses a talented persons matching apparatus for extracting an applicant who has a character image matching with demands of a recruiter. The apparatus includes a first registration part for storing information provided by the recruiter and a second registration part for storing information provided by the applicant. The first registration part stores employment conditions offered to the applicant and a personal image required by the recruiter. On the other hand, the second registration part stores objectives expressed by the applicant.

The conventional apparatus analyzes the requirement information stored in the first registration part and the objectives stored in the second registration part, and calculates a matching score of the both. Then, it is determined that the both above match each other when the score exceeds a threshold value.

The apparatus further includes a receiving part which receives location information of both of the recruiter and the applicant. The apparatus informs the information of the both to each other, when the distance of the both who are judged to match is within a threshold value distance. According to such an apparatus, both the recruiter and the applicant can effectively extract a counterpart who matches with one's own demands or requirements.

LIST OF RELATED ART

Following is a list of patent literatures which the applicant has noticed as related arts of the present disclosure.
[Patent Literature 1]
Japanese Patent Laid-Open No. 2017-97498

Problem to be Solved by Embodiments of the Disclosure

A recruiter wishes to select the applicant who satisfies the requirement information most among a lot of applicants. On the other hand, an applicant wants to select the recruiter who satisfies one's own hope most among a lot of recruiters. The user who uses the conventional apparatus can obtain information of the counterpart who matched with him. However, the user cannot judge that the counterpart is the best from the information.

Therefore, a recruiter who uses the conventional apparatus have to compare information of large number of applicants for finding out the most suitable talented person, practically. Similarly, an applicant who uses the above apparatus must compares information of large number of recruiters for finding out the best recruiter. In this regard, the conventional matching apparatus discussed above is not necessarily effective for both recruiters and applicants.

Embodiments of the present disclosure have been made to solve the above described problem, and an object of an embodiment of the present disclosure is to provide a matching apparatus which provide information of the most suitable counterpart effectively to a user who tries to have information of potential counterparts who are judged to match with the user.

SUMMARY

To achieve the above mentioned purpose, a first aspect of an embodiment of the present disclosure is a matching apparatus having an administrative server which connects via network with a terminal of an applicant and a terminal of a seeker, wherein the administrative server comprises:
an applicant information database which stores applicant information including a registered address of an applicant; and
a seeker information database which stores requirement information including a registered address of a seeker, wherein
the administrative server is configured to executes:
a matching process to store a matching score which is determined based on the applicant information and the requirement information; and
a seekers distribution display process to make the terminal of the applicant display a neighboring map including a position of an address designated by the applicant and a matching score which the applicant is concerned with; wherein
said matching score displayed by the seekers distribution display process is superimposed on the neighboring map and is displayed at the position of the registered address of a seeker who is concerned with the matching score.

A second aspect of an embodiment of the present disclosure is matching apparatus according to the first aspect discussed above, wherein
said applicant information includes information of a commute time designated by the applicant, and
said seekers distribution display process includes a process of extracting a matching score concerning with a seeker who has the registered address in an area commutable from the registered address of the applicant within said commute time, so as to make the terminal of the applicant display said matching score extracted by said process.

A third aspect of an embodiment of the present disclosure is the matching apparatus according to the first or the second aspect discussed above, wherein said administrative server further executes a requirement information supplying process to make the terminal of the applicant display the requirement information of the seeker who is concerned with the matching score indicated on the applicant terminal when requested by the applicant.

A fourth aspect of an embodiment of the present disclosure is a matching apparatus having an administrative server which connects via network with a terminal of an applicant and a terminal of a seeker, wherein
the administrative server comprises:
an applicant information database which stores applicant information including a registered address of an applicant; and
a seeker information database which stores requirement information including a registered address of a seeker, wherein the administrative server is configured to executes:

a matching process to store a matching score which is determined based on the applicant information and the requirement information; and an applicants distribution display process to make the terminal of the seeker display a neighboring map including a position of an address designated by the seeker and a matching score which the seeker is concerned with; wherein said matching score displayed by the applicants distribution display process is superimposed on the neighboring map and is displayed at the position of the registered address of an applicant who is concerned with the matching score.

A fifth aspect of an embodiment of the present disclosure is the matching apparatus according to the fourth aspect discussed above, wherein said requirement information includes information of a recruiting area designated by the seeker, said applicants distribution display process includes a process of extracting a matching score concerning with an applicant who has the registered address in said recruiting area, so as to make the terminal of the seeker display said matching score extracted by said process.

A sixth aspect of an embodiment of the present disclosure is the matching apparatus according to the fifth or the sixth aspect discussed above, wherein said administrative server further executes an applicant information supplying process to make the terminal of the seeker display the applicant information of the applicant who is concerned with the matching score indicated on the seeker terminal when requested by the seeker.

A seventh aspect of an embodiment of the present disclosure is a matching apparatus for promoting matching between an applicant and a seeker, comprising a processor, wherein said processor is configured to execute:

an applicant information read-out process to access to an applicant information database which stores applicant information including a registered address of an applicant so as to read out the applicant information;

a requirement information read-out process to access to a seeker information database which stores requirement information including a registered address of a seeker so as to read out the requirement information;

a matching process to store a matching score which is determined based on the applicant information and the requirement information; and a seekers distribution display process to display on a display unit or to print, for a designated applicant, seekers distribution information including a neighboring map which includes a position of an address designated by the applicant and a matching score which the applicant is concerned with; and said matching score displayed by the seekers distribution display process is superimposed on the neighboring map and is displayed at the position of the registered address of a seeker who is concerned with the matching score.

A eighth aspect of an embodiment of the present disclosure is a matching apparatus for promoting matching between an applicant and a seeker, comprising a processor, wherein said processor is configured to execute:

an applicant information read-out process to read out applicant information from an applicant information memory which stores applicant information including a registered address of the applicant;

a requirement information read-out process to access to a seeker information database which stores requirement information including a registered address of a seeker so as to read out the requirement information;

a matching process to store a matching score which is determined based on the applicant information and the requirement information; and a seekers distribution display process to display on a display unit or to print seekers distribution information including a neighboring map which includes a position of an address designated by the applicant and a matching score which the applicant is concerned with; and said matching score displayed by the seekers distribution display process is superimposed on the neighboring map and is displayed at the position of the registered address of a seeker who is concerned with the matching score.

A ninth aspect of an embodiment of the present disclosure is the matching apparatus according to the seventh or the eighth aspect discussed above wherein said applicant information includes information of a commute time designated by the applicant, and said seekers distribution display process includes a process of extracting a matching score concerning with a seeker who has the registered address in an area commutable from the registered address of the applicant within said commute time, so as to add said matching score extracted to said seekers distribution information.

A tenth aspect of an embodiment of the present disclosure is the matching apparatus according to anyone of the seventh through the ninth aspects discussed above, wherein said processor further executes a requirement information supplying process to make the display unit display or to print the requirement information of the seeker who is concerned with the matching score included in said seekers distribution information.

A eleventh aspect of an embodiment of the present disclosure is a matching apparatus for promoting matching between an applicant and a seeker, comprising a processor, wherein said processor is configured to execute:

an applicant information read-out process to access to an applicant information database which stores applicant information including a registered address of an applicant so as to read out the applicant information;

a requirement information read-out process to read out requirement information from a seeker information memory which stores requirement information including a registered address of the seeker;

a matching process to store a matching score which is determined based on the applicant information and the requirement information; and an applicants distribution display process to display on a display unit or to print applicants distribution information including a neighboring map which includes a position of an address designated by the seeker and a matching score which the seeker is concerned with; and said matching score displayed by the applicants distribution display process is superimposed on the neighboring map and is displayed at the position of the registered address of the applicant who is concerned with the matching score.

A twelfth aspect of an embodiment of the present disclosure is the matching apparatus according to the eleventh aspect discussed above, wherein said requirement information includes information of a recruiting area designated by the seeker, said applicants distribution display process includes a process of extracting a matching score concerning with an applicant who has the registered address in said recruiting area, so as to add said matching score extracted to said applicants distribution information.

A thirteenth aspect of an embodiment of the present disclosure is the matching apparatus according to the eleventh or the twelfth aspect discussed above wherein said processor further executes an applicant information supplying process to make the display unit display or to print the applicant information of the applicant who is concerned with the matching score included in said seekers distribution information.

A fourteenth aspect of an embodiment of the present disclosure is the matching apparatus according to anyone of the first through the thirteenth aspects discussed above, wherein both of said applicant information and said requirement information include technical background information regarding a technical background, and said matching process includes a process to store a technical background matching score which is determined based on the technical background information included in said applicant information and the technical background information included in said requirement information, and a process to store said technical background matching score or a score calculated based on said technical background matching score as said matching score.

A fifteenth aspect of an embodiment of the present disclosure is the matching apparatus according to anyone of the first through the thirteenth aspects discussed above, wherein both of said applicant information and said requirement information include syllabus information regarding acquired subjects, and said matching process includes a process to store a syllabus matching score which is determined based on the syllabus information included in said applicant information and the syllabus information included in said requirement information, and a process to store said syllabus matching score or a score calculated based on said syllabus matching score as said matching score.

A sixteenth aspect of an embodiment of the present disclosure is the matching apparatus according to anyone of the first through the thirteenth aspects discussed above, wherein said applicant information includes character information that represents the character of an applicant, said requirement information includes character information that is required to a person to be hired, and said matching process includes a process to store a congeniality matching score which is determined based on the character information included in said applicant information and the character information included in said requirement information, and a process to store said congeniality matching score or a score calculated based on said congeniality matching score as said matching score.

A seventeenth aspect of an embodiment of the present disclosure is the matching apparatus according to anyone of the first through the sixteenth aspects discussed above, wherein said matching process includes a score calculate process to calculate said matching score based on said applicant information and said requirement information.

Advantages of Embodiments of the Present Disclosure

According to the first aspect discussed above, the applicant can register applicant information to the applicant information database by using the terminal of the applicant. Further, the seeker can register requirement information to the seeker information database by using the terminal of the seeker. On the terminal of the applicant, there is shown a neighboring map where the matching score is superimposed at a point of the registered address of the seeker. The applicant can understand at first sight of the neighboring map how many seekers existing around the address designated by himself and how much the seekers satisfying his desire.

According to the second aspect discussed above, on the terminal of the applicant, there is shown distributed matching scores concerning seekers each having a registered address in the range of the commute time designated by the applicant. Therefore, the applicant can understand the situation of seekers who satisfy the commute time preference at first sight.

According to the third aspect discussed above, the applicant can make display on the terminal of the applicant the requirement information of a seeker whom being interested in upon seeing the matching score. Therefore, the applicant can effectively obtain the requirement information of the seeker with whom good matching is achieved.

According to the fourth aspect discussed above, the seeker can register requirement information to the seeker information database by using the terminal of the seeker. Further, the applicant can register applicant information to the applicant information database by using the terminal of the applicant. On the terminal of the seeker, there is shown a neighboring map where the matching score is superimposed at a point of the registered address of the applicant. The seeker can understand at first sight of the neighboring map that how many applicants existing around the address designated by himself and how much the applicants satisfying the requirement information.

According to the fifth aspect discussed above, on the terminal of the seeker, there is shown distributed matching scores concerning applicants each having a registered address in the recruiting area designated by the seeker. Therefore, the seeker can understand the situation of applicants within the recruiting area at first sight.

According to the sixth aspect discussed above, the seeker can make display on the terminal of the seeker the applicant information of an applicant whom being interested in upon seeing the matching score. Therefore, the seeker can effectively obtain the applicant information of the applicant with whom good matching is achieved.

According to the seventh aspect discussed above, it is possible to achieve a function to provide matching information on large number of seekers to each of large number of applicants by the matching apparatus of a standalone-type.

According to the eighth aspect discussed above, it is possible to provide matching information on large number of seekers to a sole applicant by the matching apparatus of a standalone-type.

According to the ninth aspect discussed above, it is possible to achieve the same function as that of the second aspect by the matching apparatus of a standalone-type.

According to the tenth aspect discussed above, it is possible to achieve the same function as that of the third aspect by the matching apparatus of a standalone-type.

According to the eleventh aspect discussed above, it is possible to provide matching information on large number of applicants to a sole seeker by the matching apparatus of a standalone-type.

According to the twelfth aspect discussed above, it is possible to achieve the same function as that of the fifth aspect by the matching apparatus of a standalone-type.

According to the thirteenth aspect discussed above, it is possible to achieve the same function as that of the sixth aspect by the matching apparatus of a standalone-type.

According to the fourteenth aspect discussed above, the applicant or the seeker can judge the level of matching with the counterpart effectively by focusing on the technical backgrounds.

According to the fifteenth aspect discussed above, the applicant or the seeker can judge the level of matching with the counterpart effectively by focusing on the acquired subjects.

According to the sixteenth aspect discussed above, the applicant or the seeker can judge the level of matching with the counterpart effectively by focusing on the congeniality between the character of the applicant and the character required to a person to be hired.

According to the seventeenth aspect discussed above, it is possible to make the administrative server calculate the matching score.

BRIEF DESCRIPTION OF THE DRAWINGS

FIG. 6 shows an example of a detailed image picture of a skill matching rate between an applicant and a company displayed on a terminal of the applicant;

FIG. 7 shows an example of a detailed image picture of a congeniality matching rate between an applicant and a company displayed on a terminal of the applicant;

FIG. 8 shows an example of a detailed image picture of a skill matching rate between an applicant and a company displayed on a terminal of the company;

FIG. 9 shows an example of a detailed image picture of a congeniality matching rate between an applicant and a company displayed on a terminal of the company;

DETAILED DESCRIPTION

First Embodiment

Configuration of the First Embodiment

Figure 1:
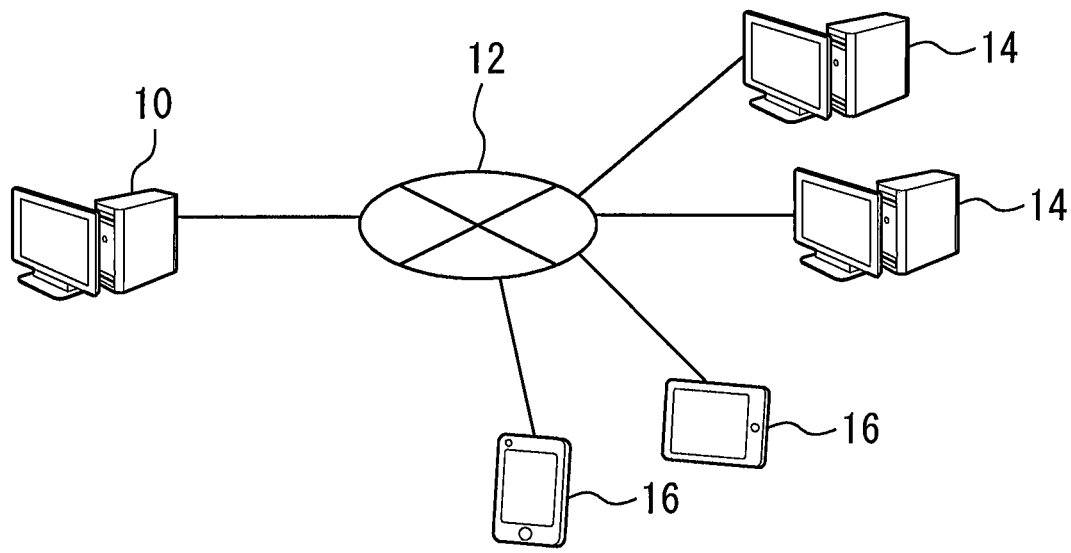
FIG. 1 is a diagram for explaining the outline of a network including a talented person matching apparatus system according to a first embodiment of the present disclosure.

FIG. 1 is a diagram for explaining outline of a network including talented person matching apparatus of the present embodiment. The talented person matching apparatus of the present embodiment comprises administrative server 10. The administrative server 10 is connected to a plurality of terminals 14, 16 through the network. In FIG. 1, the terminals indicated with refer reference numeral 14 are ones of companies, which are on the side of recruiting talented people. Further, the terminals indicated with reference numeral 16 are ones of applicants applying for an offer of companies. These above are referred to a "company terminal 14" and an "applicant terminal 16", hereinafter.

Figure 2:
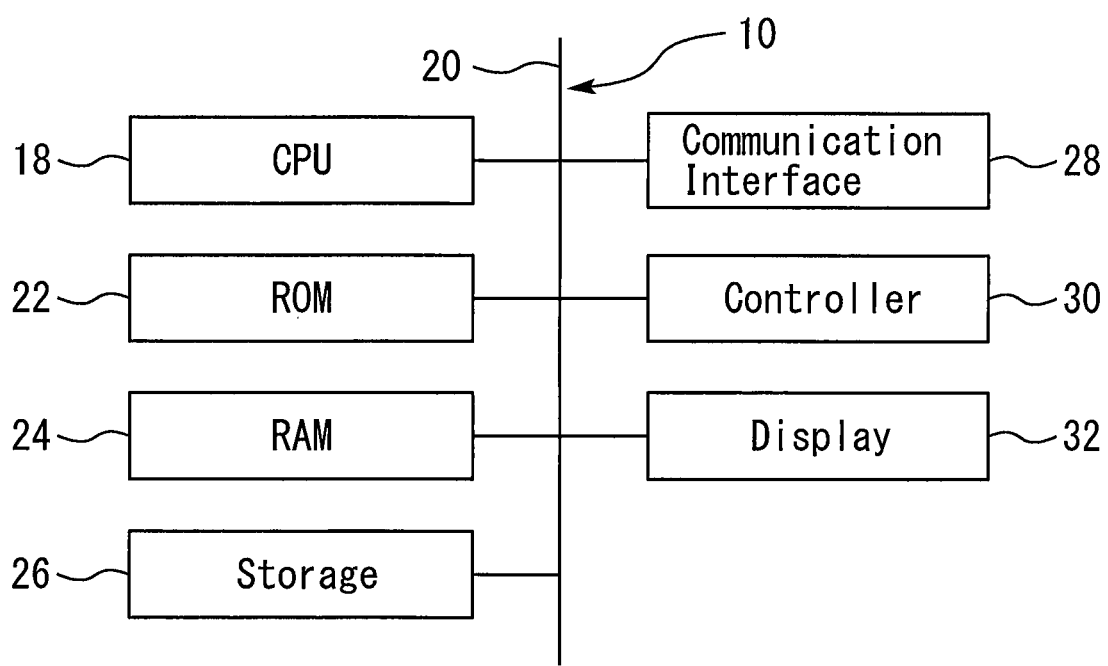
FIG. 2 is a diagram for explaining the hardware configuration of the administrative server shown in FIG. 1.

FIG. 2 shows a hardware configuration of the administrative server 10. The administrative server is configured by a general computer system and comprises a central processing unit (CPU) 18. The CPU 18 is connected to memory devices such as a ROM 22, a RAM 24, and a storage 26 through a communication bus 20. To the communication bus 20, there are further connected a communication interface 28 as well as a controller 30 and a display, each of which serves as a user interface. The administrative server 10 implements a function as the talented person matching apparatus when the CPU 18 executes a program stored in the ROM 22.

Figure 3:
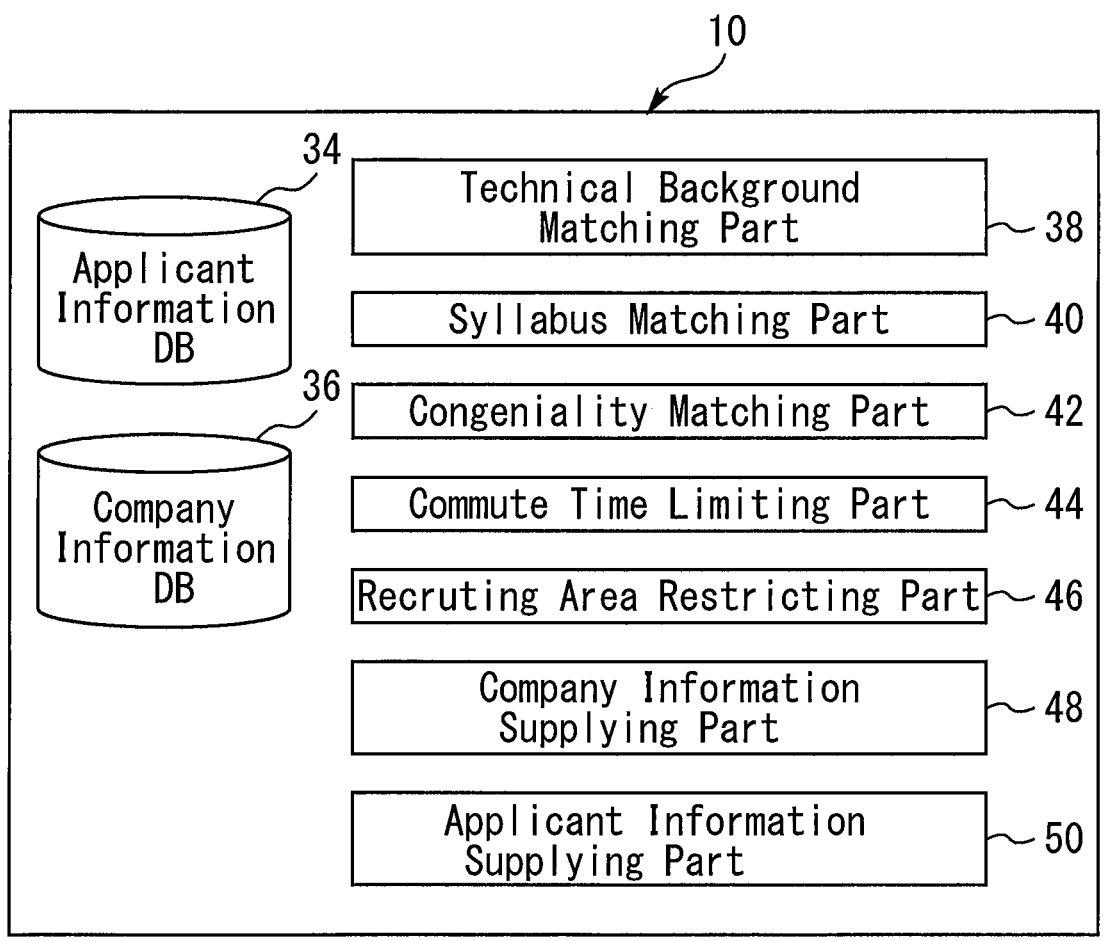
FIG. 3 is a diagram for functionally explaining the administrative server shown in FIG. 1.

FIG. 3 is a block diagram for explaining the administrative server 10 functionally. As shown in FIG. 3, the administrative server 10 includes an applicant information database 34 therein. The applicant information database 34 stores applicant information which has been sent from the applicant terminal 16.

Specifically, the applicant information includes information such as the following:
1. Basic information/Profile
2. Work Experience
3. Qualifications/Linguistic Equipment
4. Objectives The above item of "1. Basic Information/Profile" includes the following information:

A Full Name; Sex; the Date of Birth; a Post Code; an Address; the Nearest Station; Desired Commuting Means and Commuting Time; a Telephone Number; a Mail Address; Married or not; the Presence of Dependent(s); Acceptability of Moving, Information of Education; and Information on the Acquired Subjects.

The above described "Information of Education" includes the following information, specifically:

A School Name; a Department/Subject Name; Arts or Science; a Specialized Field, a Graduation (or anticipated) Year; and a School Entrance Year.

The above item of "2. Work Experience" includes the following information: Employed or Unemployed; the Number of Times of Career Change; Brief description on the Work Experience; Detailed Work Experience; and Information of Skills/Tools.

Specifically, the "Detailed Work Experience" and "Information of Skills/Tools" include the following information, respectively.

[Detailed Work Experience]

Company Name; the Number of Employees; Department Name; a Role; a Type of Employment such as a regular employee or a contracted employee; Annual Income when being employed; a Field or Type of Industry of the job; the Types of the job; Description on the job; Career History; Product Areas in which having developing experience; and Products on which having developing experience.

[Information of Skills/Tools]

Available tools; Experience of Using the Tools; Supplementary Description on the Skill and the Tool Experiences; Date of Hired; and Date of Leaving.

The above item of "3. Qualifications/Linguistic Equipment" includes the following information:

Qualifications/Rewards; Linguistic Equipment; and Skills.

Specifically, the above stated "Qualifications/Rewards", "Linguistic Equipment" and "Skills" include the following information, respectively.

[Qualifications/Rewards]

Qualifications (a description of suitable text length, such as Class C Driving Permission); Rewards (a description of suitable text length, such as winner of the Robotics Cup Japan competition); and Self-Promotion (a description of suitable text length).

[Linguistic Equipment]

Level of English; TOEIC score; TOEFL score; and/or Level of Language other than English.

[Skills]

Type of skill and degree of achievement is input according to the category thereof. The degree of achievement is input by a method of five-grade evaluation, for example. Examples of combinations of "category" and "Type of skill" are shown below.

(Category): (Type of Skill)
Technical Field/Tools: Qualifications related to an Automotive industry
Products/Parts: The Body of Car
Type of Job: Planning/Research
Education: Social Science The above item of "4. Objectives" includes the following information:

Preferable Industry (Information Communication Equipment, Computer, Semiconductor, Home Electric Appliances, Heavy Electricity, IT-related services, and the like); Preferable Type of Job (Planning, Research, Design, Development, Experiment, Evaluation, and the like); Preferable Work Area (Prefectures, Districts, and/or Municipalities); Preferable Commuting Means and Commuting Time; Preferable Time to be hired; Minimum Yearly Income; Preferable Way of Working.

Note that there may be registered a plurality of area as the "Preferable Work Area". In the present embodiment, three areas, from the first preference to the third preference, are allowed to be registered. In addition to an area which covers the applicant's present address, an area which does not cover the address is allowed to be registered as the Preferable Work Area. Hereafter, the address registered in this stage is refereed to a "registered address" of an applicant. As for the "Preferable Way of working", there may be prepared a Mark-Sheet System for questionnaire including some questions each of which can be answered by a method of five grade evaluation, for example. In the present embodiment, a question of "What do you think to be important as a result of your job?" is prepared, for example. Further, as for the present question, an entry form for answering about "Which is important for you comparing the self-realization with the contribution to society" by designating any one of five-grades is prepared.

As shown in FIG. 3, the administrative server 10 includes a company information database 36, too. In the company information database 36, there is stored requirement information which is provided by a company as a seeker.

The requirement information includes several types of information such as classified as follows, concretely:
 1. Basic Information about Recruiting:
 2. Information on an Application and a Selection: and
 3. Information about Employment and Leaving of Staffs The above item of "1. Basic Information about Recruiting" includes the following information: Department concerning the Recruiting; New Graduates or Experienced Person; Type of Job; Subject of Job; Qualifications for Applying; Background of the Offer; The Number of New Hires; The Period of Employment; Term of Trial; Work Location; Working hours; Salary; Holiday/Vacation; Treatments/Welfare programs; Education System; Talented Person Demanding; Target person (Bachelor of Science, University Graduate, Experienced Person, and the like); Other Benefits; Skill Up Support System; Characteristic of the Offer (No Relocation, Five-Day Workweek, Company Dormitory and the like); Salary Increase; Valid Duration of Job Offer; and Other Explanation (if any).

The above item of "2. Information on an Application and a selection" includes the following information: Flow until Entering a Company; The Way of Receiving an Application; Person to Contact; Number of times of the Interview; "The Nature of the Offer"; Details of the Product Field; "Useful Skills and Tools" and the like.

The above stated "The Nature of the Offer" includes information of "Personality" and "Nature" desired to the person to be hired, specifically. With regard to these items, an entry form is provided. The entry form is used to designate in five-grades that which of two positions that are poles apart regarding the "Personality", for example, is desired. For the items about the desired "Personality", Self-Introspection or Extroversion, Independence or Cooperation, Challenge Mind or Order Oriented Mind, and the like are prepared. For the items about the desired "Nature", Similar person or Diversity, Creativity or Accuracy, Player or Leader, and the like are prepared. About the "Useful Skill and Tools", an entry form which is similar to the one that is used by the applicant for registering their [Skills] is prepared. Using this form, companies register the type and the degree of achievement of a skill in the category of the skill, with regard to the skills desired to a person to be hired.

The above item of "3. Information about Employment and Leaving of Staffs" includes the following information:

The number of staffs hired during the recent three fiscal years; The number of staffs leaving during the recent three fiscal years; Average length of service; Average age of employees; and the like.

As shown in FIG. 3, a technical background matching part 38 is formed within the administrative server 10. The technical background matching part 38 executes processing of calculating and storing a matching rate about the technical background between an applicant and a company based on the applicant information submitted by the applicant and the requirement information submitted by the company. The calculated value above is referred to "a technical background matching rate", hereafter.

Inside the administrative server 10 is provided with a syllabus matching part 40 as well as a congeniality matching part 42. The syllabus matching part 40 executes processing of calculating and storing a matching rate between the applicant and the company about acquired subjects based on the applicant information and the requirement information. On the other hand, the congeniality matching part 42 executes processing of calculating and storing a matching rate about congeniality of an applicant and a company based on the applicant information and the requirement information. The calculated values above are referred to "a syllabus matching rate" and "a congeniality matching rate", hereafter.

The administrative server 10 includes a commute time limiting part 44 and a recruiting area restricting part 46. The commute time limiting part 44 executes processing of extracting companies located within the area in which the preferable commute time of the applicant is satisfied among all companies registered as a seeker for every applicant. On the other hand, the recruiting area restricting part 46 executes processing of extracting applicants living within the recruiting area designated by a seeker among all applicants for every seeker.

Within the administrative server 10, a company information supplying part 48 and an applicant information supplying part 50 are further constructed. The company information supplying part 48 execute processing of making the applicant terminal 16 display information of companies. On the other hand, the applicant information supplying part 50 executes processing of making the company terminal 14 display information of applicants.

[Functions of the Talented Person Matching Apparatus]

Figure 4:
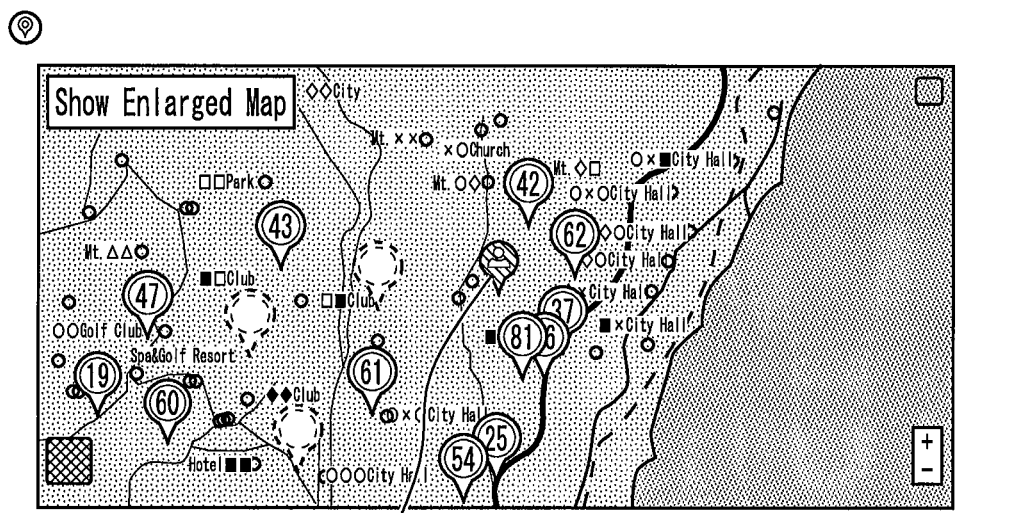
FIG. 4 shows an example of an image picture of distributed seekers displayed on a terminal of an applicant.

FIG. 4 shows an example of an image picture of distributed seekers 52 displayed on the applicant terminal 16 of a specific applicant. The image picture of distributed seekers 52 is provided by the company information supplying part 48 constructed within the administrative server 10. More specifically, the image picture is displayed when the CPU 18 in the administrative server 10 executes seeker distribution display processing according to a program stored in the ROM 22.

In the image picture of distributed seekers 52, a neighboring map which covers an address specified by the applicant (referred to "a designated address" hereafter) is displayed. The applicant may use the registered address as the designated address. Alternately, the applicant may designate an address other than the registered address as the designated address by clicking a specific point on the image picture of the map. The mark indicated on the neighboring map with a reference numeral 53 is an applicant mark. The applicant mark 53 is indicated at the registered address of the applicant. Further, the mark indicated on the neighboring map with the reference numeral such as "81", "62", "61" or the like" is a matching rate of the applicant with each of the companies.

As described above, the administrative server 10 includes the matching parts 38, 40, 42 to calculate three kinds of matching rate. In the present embodiment, among those three matching rates, the technical background matching rate and the syllabus matching rate are composed so as to calculate a skill matching rate which represent the level of technical matching. On the neighboring map shown in FIG. 4, a plurality of the skill matching rates are indicated.

The individual skill matching rate is displayed at the registered address of a company concerning with it. It should be noted that the registered address of a company is the address that is registered as the work location by each company in the requirement information. Further, In the image picture of distributed seekers 52 shown in FIG. 4, there are shown only companies each of which have a registered address within the area in which the preferable commute time or the applicant is satisfied, in the first preference work area of the applicant. Therefore, the applicant who look at the image picture of distributed seekers 52 can understand at the first sight how distributed companies are within the area in which the preference of the commute time is satisfied and how much the matching rates with those companies are.

The applicant who looks at the image picture of distributed seekers 52 shown in FIG. 4 is usually interested in companies with whom the skill matching rate gets a high value. Further, since the applicant has known all information about companies within the commutable area, it is possible for the applicant to understand that the company of matching rate "81" is the best place for efficiently making use of his ability. Therefore, the applicant can extremely effectively select the company which he should practically apply for.

Figure 5:
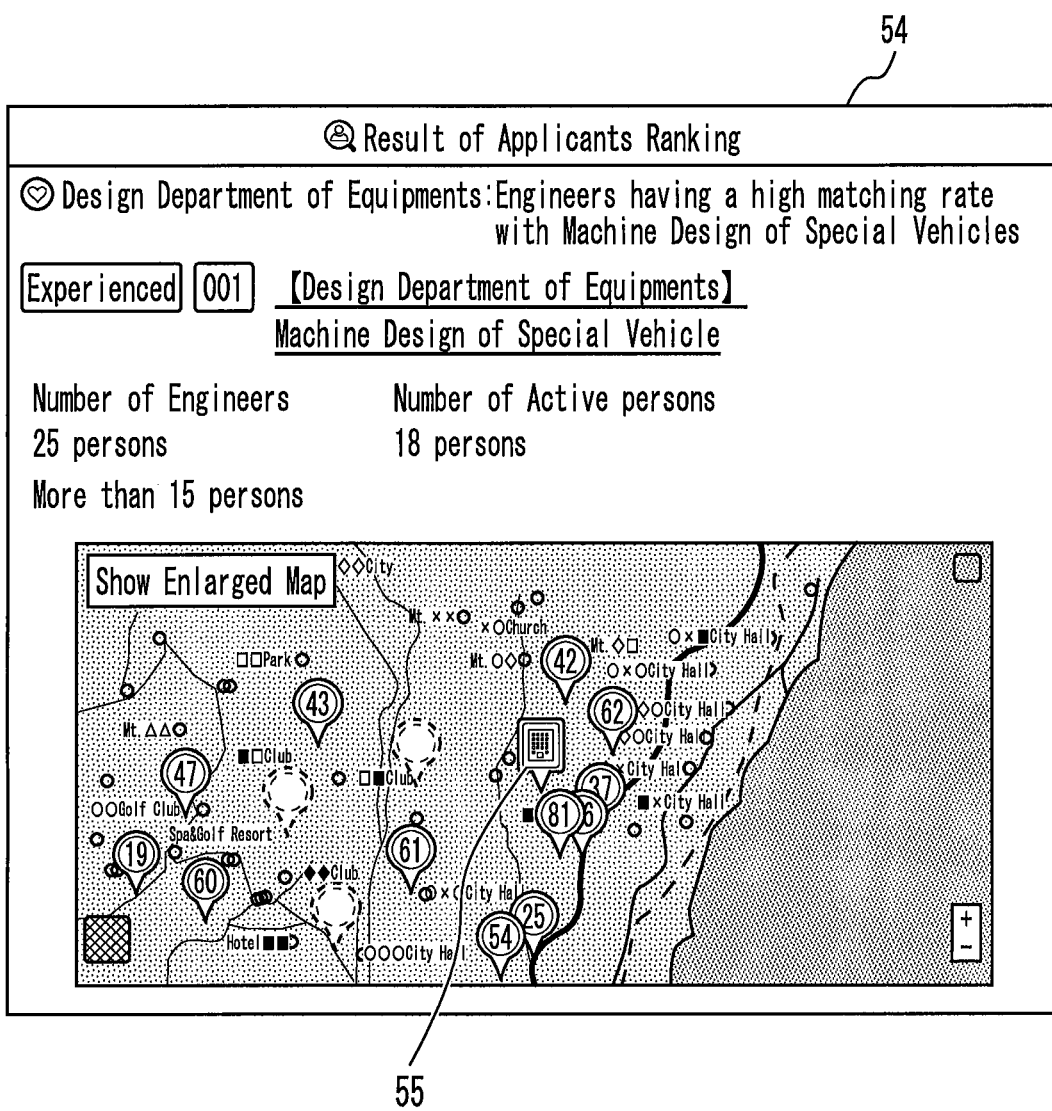
FIG. 5 shows an example of an image picture of distributed applicants displayed on a terminal of a company which is a seeker.

FIG. 5 shows an example of an image picture of distributed applicants 54 shown on the company terminal 14 of a particular company. The image picture of distributed applicants 54 is provided by the applicant information supplying part 50 constructed in the administrative server 10. More specifically, the image picture is shown when the CPU 18 in the administrative server 10 executes applicant distribution display processing according to a program stored by the ROM 22.

In the image picture of distributed applicants 54, a neighboring map which covers an address designated by a company, that is, the designated address of the company is displayed. The person who is in charge of recruiting of the company may use the registered address as it is as the designated address. Alternately, the person in charge of recruiting may designate an address other than the registered address as the designated address by clicking a specific point on the image picture of the map. The mark indicated on the neighboring map with a reference numeral 55 is a company mark. The company mark 55 is indicated at the registered address of the company. Further, the mark indicated on the neighboring map with the reference numeral such as "81", "62", "61" or the like" is the skill matching rate between the company and an individual applicant.

The individual skill matching rate is displayed at the registered address of an applicant concerning with it. Matching rates of the same value are shown in the same position in FIGS. 4 and 5 for convenience. However, as stated above, those shown in FIG. 4 should be understood so as to be indicated at the registered addresses of the companies which are seekers. On the other hand, those shown in FIG. 5 should be understood so as to be indicated at the registered addresses of the applicants.

Further, in the image picture of distributed applicants 54 shown in FIG. 5, there are shown only applicants who live within the area in which the commute time preference is satisfied, in the recruiting area defined by the company. Therefore, the company person in charge of recruiting who look at the image picture of distributed applicants 54 can understand at the first sight how distributed applicants are within the area in which he is allowed to hire and how much the matching rates with those applicants are.

The person in charge of recruiting who looks at the image picture of distributed applicants 54 shown in FIG. 5 is usually interested in applicants with whom the skill matching rate gets a high value. Further, since the person in charge of recruiting has known all information about applicants who live within the area in which recruiting is allowed, it is possible for the company person to immediately understand that the applicant of matching rate "81" is the top candidate to have contact with. Therefore, the company person can extremely effectively conduct a selection of applicants.

According to the talented person matching apparatus of the present embodiment, an applicant can read on an applicant terminal 16 requirement information of a company in which being interested. On the other hand, a company as a seeker can read on a company terminal 14 applicant information of an applicant in which being interested. These functions are accomplished by the administrative server 10 when it executes programs for implementing the company information supplying part 48 and the applicant information supplying part 50, respectively. Now, with reference to FIG. 6 through FIG. 9, it will be described how the detailed information about the matching rate is indicated on the applicant terminal 16 and the company terminal 14, respectively, according to the above functions.

FIG. 6 shows a detailed image picture shown on the applicant terminal 16 when desired by an applicant. On the detailed image picture, there is indicated matching rates between the applicant and ◯◯development center of ◯◯Inc. More specifically, in the image picture 56, there are shown that a skill matching rate and a congeniality rate between the both are "85%" and "72.5%", respectively. Further, details of the 85% skill matching rate are shown in the image picture 56.

As stated above, the skill matching rate includes two rates of "a technical background matching rate" and "a syllabus matching rate". In the present embodiment, the technical background matching rate is determined from four items of the "Type of Job", "Education", "Products/Parts" and "Technical Field/Tools" as shown in the image picture 56. The image picture 56 includes slide bars and radar charts respectively indicating each value of those items. The above values are determined based on the "Skills/Tools" information included in the applicant information and the "Useful Skills and Tools" information included in the requirement information.

Each of the matching rates above are able to be calculated in the administrative server 10 by using an analytical method of a probabilistic inference model or the like such as statistical attribute analysis or Bayesian network, for example. For the calculation above, functions of artificial intelligence which understand a natural language may be utilized in a process for digitizing linguistic information. It should be noted that the determination steps of the matching rates are not limited to the above, and human judgments may be combined to a part of or all of them. This point is also applicable to determination steps for the other matching rates described below.

The syllabus matching rate is determined based on the "Acquired Subjects" information included in the applicant information and the "Useful Skills and Tools" information included in the requirement information. The "Useful Skills and Tools" information does not necessarily include information of acquired subjects. In the present embodiment, relationships between each items of the acquired subjects and each items of skills or tools are predefined, so the matching rates for the acquired subjects can be calculated from the information of the "Useful Skills and Tools". This method is also applicable to the calculation of other matching rates.

FIG. 7 shows a detailed image picture 58 about the congeniality matching rate between an applicant and ◯ Development Center. The detailed image picture 58 shown in FIG. 7 is displayed when the part indicating "Congeniality Matching Rate 72.5%" in the detailed image picture 56 shown in FIG. 6 is clicked. In the detailed image picture 58 shown in FIG. 7, there are indicated matching rates of items which are details of the congeniality matching rate between the applicant and the company. These matching rates are determined based on the information of "Brief Description on the Work Experience", "Description on the job", "Supplementary Description on the Skill and the Tool Experiences", "Qualifications/Rewards" and the likes in the applicant information as well as "The Nature of the Offer" in the requirement information.

On the stage of determining the congeniality matching rate, a method of the analysis to personalize can be employed in order to digitize the character and tendency of a person by analyzing documents and/or expressions on conversations of the person. In the present embodiment, the above method is used for analyzing various descriptions included in the applicant information and then digitizing them.

FIG. 8 shows a detailed image picture 60 of matching rates of a particular applicant displayed on the company terminal 14 of a company, when desired.

In the detailed image picture 60, there are indicated slide bars and a radar chart about each details of a technical matching rate (Type of Job, Education, Products/Parts, Technical Field/Tools) as well as a slide bar of a syllabus matching rate, as shown in FIG. 6.

FIG. 9 shows a detailed image picture 62 about the congeniality matching rate between a company and particular applicants. In the detailed image picture 62, matching rates for items which are details of the congeniality matching rate are shown as show in FIG. 7. Note that the ways for determining the numeric value shown in FIGS. 8 and 9 are identical with those employed for determining the numerical values shown in FIGS. 6 and 7. So, redundant explanation will be omitted here for avoiding repetition. Further, it should be noted that the numeric values in FIGS. 8 and 9 are shown just for exemplary purpose, and mutual correspondences are not considered between the both.

[Typical Process in the Administrative Server]

Figure 10:
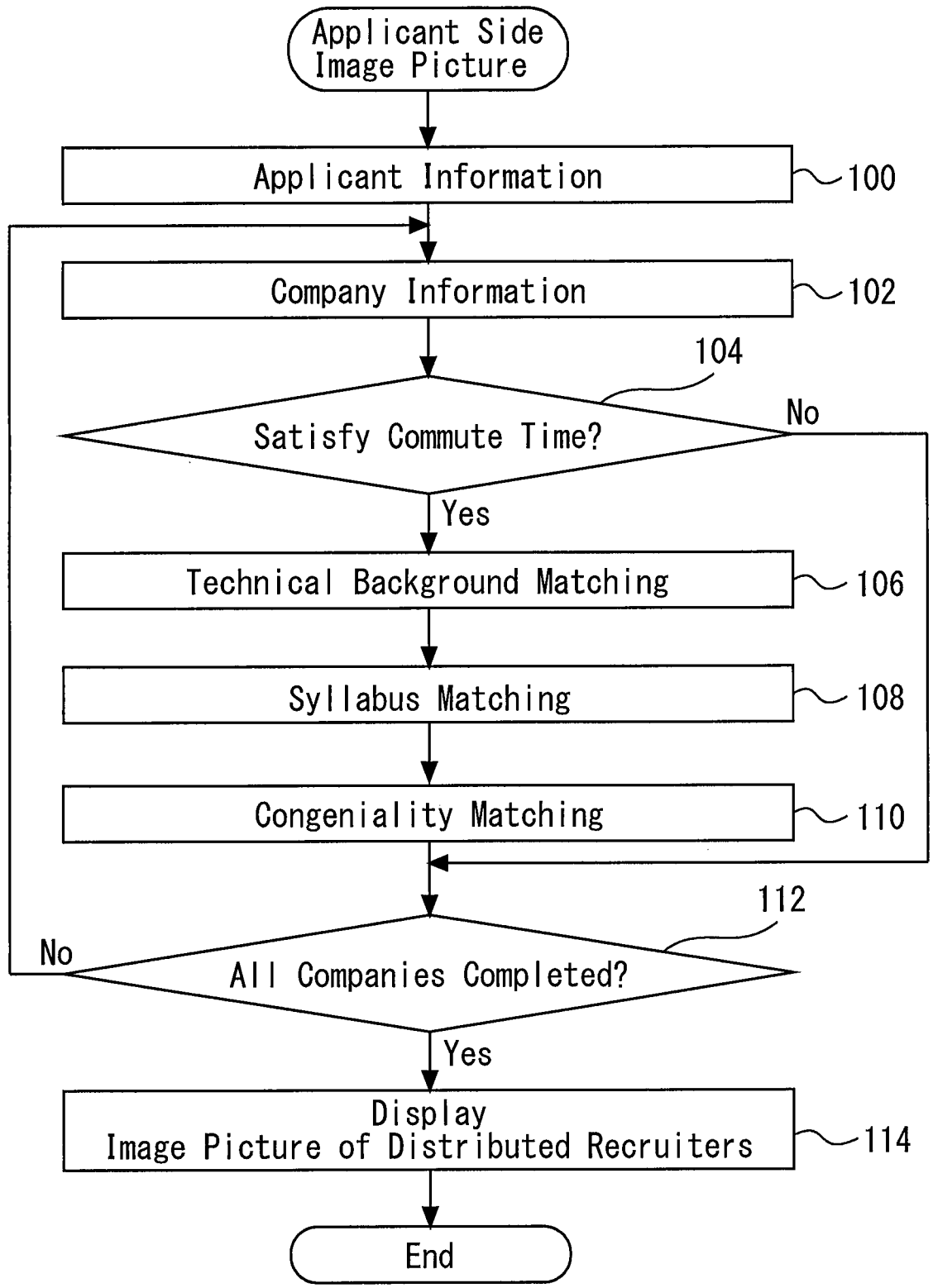
FIG. 10 shows a flowchart for explaining the flow of the process performed by the administrative server shown in FIG. 1 to make the terminal of the applicant display the image picture of distributed seekers shown in FIG. 4.

FIG. 10 is a flowcharts for describing a flow of a processing executed by the administrative server 10 to display seeker's distribution. The routine shown in FIG. 10 is started when an applicant demands supply of company information to the administrative server 10 through the applicant terminal 16. In the present routine, at first, applicant information of the applicant is read out from the applicant information database 34 (step 100).

Then, company information including requirement information is read out with regard to a specific company among those registered as seekers from the company information database 36 (step 102).

Then, it is determined whether the registered address of the company satisfies the preferable commute time of the applicant (step 104). Specifically, a typical commuting root which links the registered address of applicant to registered address of company is determined, then it is determined whether the commute time by the determined root is within the preferable commute time of the applicant.

As a result, when it is determined that the company does not satisfy the preferable commute time of the applicant, processing of steps 106 through 110 are jumped, and processing of step 112 is performed next. On the other hand, when it is determined that the preferable commute time is satisfied, processing for the technical background matching is performed next (step 106). Specifically, it is determined firstly whether a technical background matching rate between the applicant and the company has been already recorded in the administrative server 10. In a case where it has been recorded, the technical background matching rate is read out. On the other hand, when it is not recorded, a technical background matching rate is calculated by the way described above with reference to FIG. 6, and then it is stored.

Following the above processing, processing for the syllabus matching is carried out (step 108). As the case of the technical background matching rate, a syllabus matching rate is read out when it has been already recorded. On the other hand, when it is not recorded, a syllabus matching rate is calculated by the way described above with reference to FIG. 6, and then it is recorded.

Next, processing for the congeniality matching is carried out (step 110). Here, a congeniality matching rate is read out when it has been already recorded. On the other hand, when it is not recorded, a congeniality matching rate is calculated by the way described above with reference to FIG. 7, and then it is recorded.

After completion of the above, it is determined whether the above processes are executed for all the companies registered as a seeker (step 112). When it is determined that the above processes are not yet executed for all the companies, processing of step 102 and the sequences are performed for a next company.

On the other hand, when it is determined that the processes for all the companies are completed, next processing is executed to display on the applicant terminal 16 an image picture of distributed seekers (see, FIG. 4) in which the results of the matching rates are reflected (step 114).

The administrative server 10 may display on the applicant terminal 16 a list of all the companies displayed in the image picture of distributed seekers (see, FIG. 4), for example, in addition to execute the processes shown in FIG. 10. Furthermore, the administrative server 10 may provide to the applicant terminal 16 information of a recruiting offer of a company which is designated by the applicant via the list or the image picture of distributed seekers. The applicant, thereby, can narrow the target of companies interesting extremely effectively.

Figure 11:
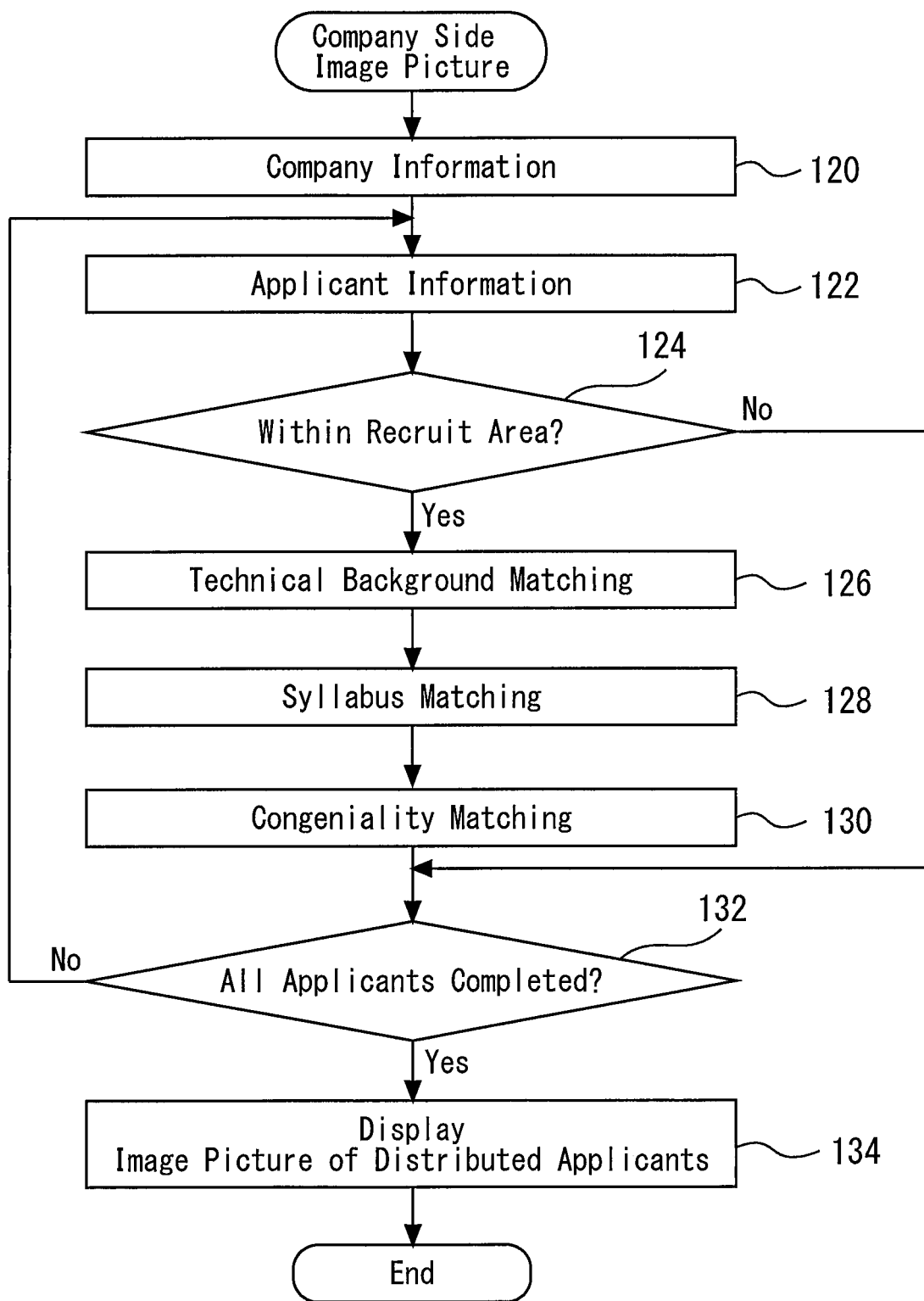
FIG. 11 shows a flowchart for explaining the flow of the process performed by the administrative server shown in FIG. 1 to make the terminal of the company display the image picture of distributed applicants shown in FIG. 5.

FIG. 11 is a flowcharts for describing a flow of a processing executed by the administrative server 10 to display applicant's distribution. The routine shown in FIG. 11 is started when a company as a seeker demands supply of applicant information to the administrative server 10 through the company terminal 14. In the present routine, at first, information of the company including requirement information is read out from the company information database 36 (step 120).

Then, applicant information of an applicant who is the target of processing of the present process cycle is read out from the applicant information database 34 (step 122).

Then, it is determined whether the registered address of the applicant is located within a recruiting area designated by the company (step 124).

As a result, when it is determined that the registered address of the applicant is out of the recruiting area, processing of steps 126 through 130 are jumped, and processing of step 132 is performed next. On the other hand, when it is determined that the requirement of the recruiting area is satisfied, processes for the technical background matching (step 126), the syllabus matching (step 128) and the congeniality matching (step 110) are carried out sequentially. These processes are proceeded by ways substantially same as the processes of steps 106, 108 and 110 shown in FIG. 10.

After completion of the above, it is determined whether the above processes are executed for all the applicants registered in the applicant information database 34 (step 132). When it is determined that the above processes are not yet executed for all the applicants, processing of step 122 and the sequences are performed for a next applicant.

On the other hand, when it is determined that the processes for all the applicants are completed, next processing is executed to display on the company terminal 14 an image picture of distributed applicants (see, FIG. 5) in which the results of the matching rates are reflected (step 114).

The administrative server 10 may display on the company terminal 14 a list of all the applicants displayed in the image picture of distributed applicants (see, FIG. 5), for example, in addition to execute the processes shown in FIG. 11. Furthermore, the administrative server 10 may provide to the company terminal 14 information of a specific applicant designated by a person of the company who is in charge of recruiting via the list or the image picture of distributed applicants. The person in charge of recruiting, thereby, can narrow the target of applicants interesting extremely effectively.

Modification of the First Embodiment

In the first embodiment stated above, particular examples are described as items of the applicant information to be registered by an applicant and the requirement information to be registered by a company. However, they are not limited as above. Items included in the applicant information or the requirement information can be appropriately changed as necessary.

Further, in the first embodiment 1 stated above, skill matching rates are indicated in both of the image picture of distributed seekers 52 shown in FIG. 4 and the image picture of distributed applicants 54 shown in FIG. 5. However, the indications are not limited to those. For example, anyone of technical background matching rates, syllabus matching rates, and congeniality matching rates may be indicated in place of the skill matching rates. Alternatively, integrated values of any combination of the above three types of matching rates may be indicated instead. Further, it may be decided by the applicants and the companies as users, what kind of matching rates should be indicated.

Moreover, in the embodiment described above, matching level of an applicant and a company is evaluated by the three items of technical background, syllabus and congeniality. However, the present disclosure is not limited to the above. That is, the names given to those items are not limited to the above and can be changed to appropriate ones. Further, other items expressing the level of matching between an applicant and a company may be created so as to be added to the above described three items or replaced with anyone of the three items above.

In the first embodiment stated above, how much an applicant and a company match each other is expressed by matching rates. However, the value representing the level of matching is not limited to "rate(s)", and may be replaced to any score(s) such as one(s) based on five-grade evaluation or ten-grade evaluation which can be used for expressing the level of matching.

In the first embodiment stated above, the companies displayed on the image picture of distributed seekers 52 are limited to those which satisfy the preferable commute time of the applicant. Similarly, the applicants displayed on the image picture of distributed applicants 54 is limited to those who satisfy the requirement of the recruiting area. However, these limitations are not necessarily the essential elements of the present disclosure. Information of companies and applicants that are not restricted by the above limitation may be provided to the applicant terminal 16 and the company terminal 14.

In the first embodiment stated above, the function for supplying the image picture of distributed seekers 52 to the applicant terminal 16 and the function for supplying the image picture of distributed applicants 54 to the company terminal 14 are both achieved in the administrative server 10. However, the present disclosure is not limited to the above. The matching apparatus may be constructed so that only one of the above two functions may be achieved in the administrative server 10.

In the first embodiment stated above, a companies seeking talented people is referred to a "seeker" as well as a people seeking a job is called an "applicant". However, the combination of the seeker and the applicant is not limited to the above example. The scope of the present disclosure covers a matching apparatus in which following combinations are applied to the "seeker" and the "applicant":

a retailer and a consumer;
a man and a woman who are seeking a partner;
a restaurant and a customer;
a company offering a service and a company wanting to outsource the service; and
users of dating site.

Further, in the first embodiment stated above, company terminals 14 and applicant terminals 16 are used as interface for inputting and outputting information. However, the present disclosure is not limited to the above. For example, a matching apparatus having interface for inputting and outputting of information may be set in an organization such as university which needs to help student to find a job. In this case, the applicant information database 34 and the company information database 36 may be provided in the apparatus, or may be prepared outside the apparatus. This modification supports the seventh aspect of the present disclosure described above.

Alternatively, the matching apparatus according to the present disclosure may be owned by an applicant individually. In this case, applicant information needed is just of the owner's one, and those of other persons are not necessary. So, the applicant information database 34 may be replaced to a memory storing the applicant information of the individual applicant. Further, the company information database 36 may be prepared outside the apparatus. This modification supports the eighth aspect of the present disclosure described above.

Moreover, the matching apparatus according to the present disclosure may be owned by a company, i.e., a seeker. In this case, requirement information needed is just of the owner's one, and those of other companies are not necessary. So, the company information database 36 may be replaced to a memory storing the requirement information of the sole company. Further, the applicant information database 34 may be prepared outside the apparatus. This modification supports the eleventh aspect of the present disclosure described above.

What is claimed is:

1. A matching apparatus comprising an administrative server which connects via network with a terminal of an applicant and a terminal of a seeker, wherein
the administrative server comprises:
an applicant information database which stores applicant information including a registered address of an applicant; and
a seeker information database which stores requirement information including a registered address of a seeker, wherein
the administrative server is configured to execute:
a matching process to store a matching score which is determined based on the applicant information and the requirement information; and
a seekers distribution display process to make the terminal of the applicant display a neighboring map including a position of an address designated by the applicant and a matching score which the applicant is concerned with; wherein
said matching score displayed by the seekers distribution display process is superimposed on the neighboring map and is displayed at the position of the registered address of a seeker who is concerned with the matching score, wherein both of said applicant information and said requirement information include syllabus information regarding acquired subjects, and
said matching process includes:
a process to store a syllabus matching score which is determined based on the syllabus information included in said applicant information and the syllabus information included in said requirement information, and
a process to store said syllabus matching score or a score calculated based on said syllabus matching score as said matching score.

2. The matching apparatus according to claim 1, wherein
said applicant information includes information of a commute time designated by the applicant, and
said seekers distribution display process includes a process of extracting a matching score concerning with a seeker who has the registered address in an area commutable from the registered address of the applicant within said commute time, so as to make the terminal of the applicant display said matching score extracted by said process.

3. The matching apparatus according to claim 1, wherein said administrative server further executes a requirement information supplying process to make the terminal of the applicant display the requirement information of the seeker who is concerned with the matching score indicated on the applicant terminal when requested by the applicant.

4. The matching apparatus according to claim 1, wherein
both of said applicant information and said requirement information include technical background information regarding a technical background, and
said matching process includes:
a process to store a technical background matching score which is determined based on the technical background information included in said applicant information and the technical background information included in said requirement information, and
a process to store said technical background matching score or a score calculated based on said technical background matching score as said matching score.

5. The matching apparatus according to claim 1, wherein
said applicant information includes character information that represents the character of an applicant,
said requirement information includes character information that is required to a person to be hired, and
said matching process includes:
a process to store a congeniality matching score which is determined based on the character information included in said applicant information and the character information included in said requirement information, and
a process to store said congeniality matching score or a score calculated based on said congeniality matching score as said matching score.

6. The matching apparatus according to claim 1, wherein said matching process includes a score calculate process to calculate said matching score based on said applicant information and said requirement information.

7. A matching apparatus comprising an administrative server which connects via network with a terminal of an applicant and a terminal of a seeker, wherein
the administrative server comprises:
an applicant information database which stores applicant information including a registered address of an applicant; and a seeker information database which stores requirement information including a registered address of a seeker, wherein the administrative server is configured to execute:

a matching process to store a matching score which is determined based on the applicant information and the requirement information; and an applicants distribution display process to make the terminal of the seeker display a neighboring map including a position of an address designated by the seeker and a matching score which the seeker is concerned with; wherein said matching score displayed by the applicants distribution display process is superimposed on the neighboring map and is displayed at the position of the registered address of an applicant who is concerned with the matching score, wherein both of said applicant information and said requirement information include syllabus information regarding acquired subjects, and said matching process includes:

a process to store a syllabus matching score which is determined based on the syllabus information included in said applicant information and the syllabus information included in said requirement information, and a process to store said syllabus matching score or a score calculated based on said syllabus matching score as said matching score.

8. The matching apparatus according to claim 7, wherein
said requirement information includes information of a recruiting area designated by the seeker, and said applicants distribution display process includes a process of extracting a matching score concerning with an applicant who has the registered address in said recruiting area, so as to make the terminal of the seeker display said matching score extracted by said process.

9. The matching apparatus according to claim 7, wherein said administrative server further executes an applicant information supplying process to make the terminal of the seeker display the applicant information of the applicant who is concerned with the matching score indicated on the seeker terminal when requested by the seeker.

10. The matching apparatus according to claim 7, wherein
both of said applicant information and said requirement information include technical background information regarding a technical background, and said matching process includes:

a process to store a technical background matching score which is determined based on the technical background information included in said applicant information and the technical background information included in said requirement information, and a process to store said technical background matching score or a score calculated based on said technical background matching score as said matching score.

11. The matching apparatus according to claim 7, wherein
said applicant information includes character information that represents the character of an applicant, said requirement information includes character information that is required to a person to be hired, and said matching process includes;

a process to store a congeniality matching score which is determined based on the character information included in said applicant information and the character information included in said requirement information, and a process to store said congeniality matching score or a score calculated based on said congeniality matching score as said matching score.

12. The matching apparatus according to claim 7, wherein
said matching process includes a score calculate process to calculate said matching score based on said applicant information and said requirement information.

13. A matching apparatus for promoting matching between an applicant and a seeker, comprising processor circuitry, wherein said processor circuitry configured to execute:

an applicant information read-out process to access to an applicant information database which stores applicant information including a registered address of an applicant so as to read out the applicant information;

a requirement information read-out process to access to a seeker information database which stores requirement information including a registered address of a seeker so as to read out the requirement information;

a matching process to store a matching score which is determined based on the applicant information and the requirement information; and a seekers distribution display process to display on a display unit or to print, for a designated applicant, seekers distribution information including a neighboring map which includes a position of an address designated by the applicant and a matching score which the applicant is concerned with; and said matching score displayed by the seekers distribution display process is superimposed on the neighboring map and is displayed at the position of the registered address of a seeker who is concerned with the matching score, wherein both of said applicant information and said requirement information include syllabus information regarding acquired subjects, and said matching process includes:

a process to store a syllabus matching score which is determined based on the syllabus information included in said applicant information and the syllabus information included in said requirement information, and a process to store said syllabus matching score or a score calculated based on said syllabus matching score as said matching score.

14. The matching apparatus according to claim 13, wherein
said applicant information includes information of a commute time designated by the applicant, and said seekers distribution display process includes a process of extracting a matching score concerning with a seeker who has the registered address in an area commutable from the registered address of the applicant within said commute time, so as to add said matching score extracted to said seekers distribution information.

15. The matching apparatus according to claim 13, wherein said processor circuitry further executes a requirement information supplying process to make the display unit display or to print the requirement information of the seeker who is concerned with the matching score included in said seekers distribution information.

16. The matching apparatus according to claim 13, wherein
both of said applicant information and said requirement information include technical background information regarding a technical background, and said matching process includes:
a process to store a technical background matching score which is determined based on the technical background information included in said applicant information and the technical background information included in said requirement information, and
a process to store said technical background matching score or a score calculated based on said technical background matching score as said matching score.

17. The matching apparatus according to claim 13, wherein
said applicant information includes character information that represents the character of an applicant,
said requirement information includes character information that is required to a person to be hired, and
said matching process includes:
a process to store a congeniality matching score which is determined based on the character information included in said applicant information and the character information included in said requirement information, and
a process to store said congeniality matching score or a score calculated based on said congeniality matching score as said matching score.

* * * * *